A. T. WEBB.
LENS MEASURE.
APPLICATION FILED JAN. 25, 1913.
1,151,635.
Patented Aug. 31, 1915.
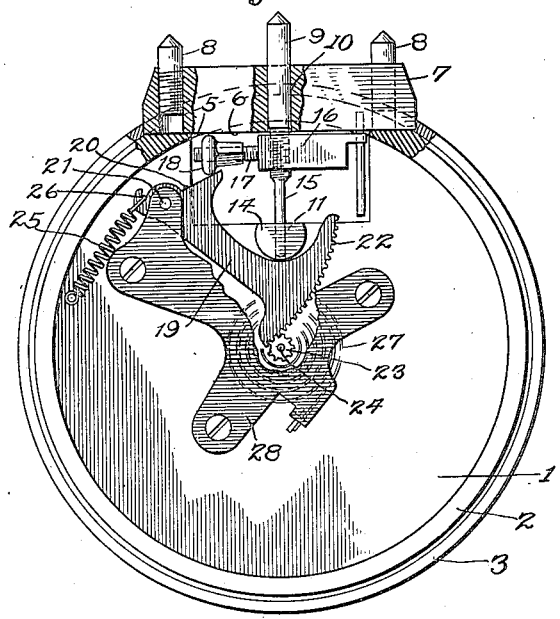
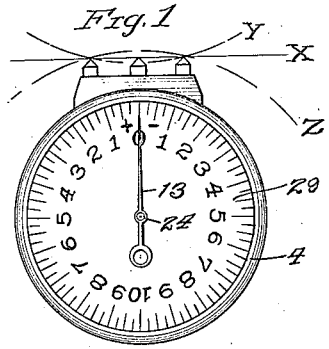
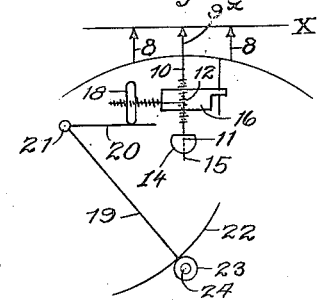
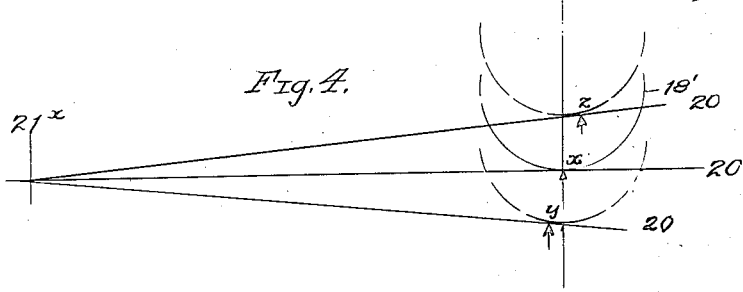
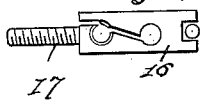
WITNESSES:
L. B. Graham
Milton Lenoir
INVENTOR:
Austin T. Webb
By Hopkins
Att'y.

UNITED STATES PATENT OFFICE.

AUSTIN T. WEBB, OF CHICAGO, ILLINOIS.

LENS-MEASURE.

1,151,635.  Specification of Letters Patent.  Patented Aug. 31, 1915.

Application filed January 25, 1913. Serial No. 744,204.

*To all whom it may concern:*

Be it known that I, AUSTIN T. WEBB, a citizen of the United States, residing at Chicago, in the county of Cook and State of Illinois, have invented certain new and useful Improvements in Lens-Measures, of which the following is a specification.

The present invention relates to that general class of lens measures, well known in the art, by which, the refractive power of the glass of which the lens is made being known, the focus of the lens (or, conversely, the curvature which the lens must have in order to have a given focus) may be ascertained and indicated upon a scale calibrated in convenient units of focal distance (say, diopters).

The movement of the movable point pin of a lens measure is transmitted to the pointer and during the transmission the right line movement of the point pin is converted into rotary movement of the pointer.

It is a fact well known to practical mechanicians that in the transmission of movement through coöperating movable parts, errors are not only transmitted through the system but in addition thereto they are frequently multiplied or augmented during transmission, and this is particularly true of transmitting mechanism embodying differential characteristics in which the extent of the initial movement is increased at the expense of some other factor.

The units of measurement with which lens measures have to deal are so infinitesimally small that an increasing mechanism of some sort or other must be used in order that the graduations of the dial on which the results are indicated may be sufficiently distinct for convenient reading. It is therefore of great importance that lens measures have a minimum number of parts of as simple construction as possible, regard being had for the efficient accomplishing of the objects of the instrument.

Hence another object of the present invention is to provide a lens measure which shall in practical use be efficient while at the same time it shall have as few parts of as simple construction as may be, and therefore easy of assemblage and adjustment in the first instance and of subsequent adjustment should this become necessary. And to this end the invention consists in the features of novelty that are hereinafter described with reference to the accompanying drawing, which is made a part of this specification and in which—

Figure 1 is a face view of a lens measure embodying the invention. Fig. 2 is a front elevation thereof on a larger scale and with the dial and hand or pointer omitted in order to give an unobstructed view of the working parts of the instrument. Fig. 3 is a skeleton or diagrammatic view showing the cardinal lines and points of the several parts of the instrument. Fig. 4 is an enlarged diagrammatic view of the sector contact and the working surface of the contact arm of the sector. Fig. 5 is a plan-view of a nut adjustably mounted upon the movable point pin and in turn carrying an arm which is lateral (perpendicular) to the line of movement of said point pin and on which the sector contact is adjustably mounted.

The base of the instrument consists of a rigid cast metal disk 1 having a marginal flange, 2, cast integrally therewith, so that it is in the form of a one-piece cylindrical box or casing inclosed by a thin jacket, 3, of some suitable metal that is susceptible of taking a high polish or being plated with a finer metal. The open side, or rather the top of the composite-casing thus made is covered by a crystal which is carried by a ring or bezel, 4, which is snapped on or otherwise suitably secured to the casing. The flange 2 is provided at 5 with an opening which is made by milling away the flange to the depth of a plane which chords it, thereby providing a plane or flat surface, 6, which, is less in width than the flange 2 is in depth, thereby leaving circular portions, indicated by dotted lines in Fig. 2, which span the opening and lie against the opposite faces of the point block, 7. This flat surface 6 forms a firm supporting base for the inner face of the point block which latter is secured in place by soldering, brazing, or other suitable means, so that the point block is absolutely rigid and immovable relatively to the base of the instrument which carries all of the movable parts. These are important features of my invention since they insure the strength and stability of this part of the instrument and absolutely prevent any relative movement of the parts that tends to prevent accuracy.

The point block is equipped in customary manner with a plurality of pins the points of which are adapted to contact with the surface of the lens whose curvature is to be measured. Usually three such point pins are used and for the purpose of this application three are shown in the drawing, although a greater number may be used in connection with some of the other novel features of the instrument, without departing from the spirit of this part of the invention, the essential consideration in this respect being that at least one of the point pins shall be movable relatively to the others. The point pins, 8, are fixed and secured directly to the point block and this may be done by providing the pins with screw threads which engage corresponding threads formed in sockets in the point block. By this means the so-called fixed point pins may be adjusted. Albeit it is understood that when once adjusted, during the assembling of the parts, they shall thereafter remain fixed, this being the normal condition during the use of the instrument. The point pin, 9, is freely movable endwise in the line of its axis, $9^x$ (Fig. 3). It is guided in its endwise movements and held against lateral movement by two bearings, 10 and 11, located distant from each other adjacent the opposite ends of the pin and upon opposite sides of the point, 12, which may appropriately be called the load point, from which its motion is taken off for transmission to the hand or pointer, 13. The bearing, 10, is formed by making a simple bore through the point block 7 and the bearing 11 is formed by making a bore through a post, 14, which is cast integrally with the disk, 1, and projects therefrom, the end, 15, of the pin which occupies this bore being preferably reduced in diameter. Heretofore only a single bearing has been used for guiding the movable point pin and although this bearing has been made comparatively long, in fact objectionably so, it has not met both of two opposing requisites, namely, the one that the pin have perfect freedom of endwise movement, and the other, that it be absolutely restrained and prevented from even the slightest lateral movement, any lateral movement being open to the objection that it will disturb the points of actual contact and produce error.

An intermediate portion of the point pin, 9, is screw threaded and has engagement with a correspondingly threaded nut, 16, which, in turn, carries an arm which is lateral (perpendicular) to the axis or line of movement, $9^x$ (Fig. 3) of the point pin 9, by which lateral arm movement is taken off from the nut 16, for transmission to the hand or pointer, as aforesaid. As shown in the drawing, this lateral arm consists of a screw threaded pin 17, and carries a part, 18, in the nature of a nut, and herein called the "sector-contact," being the part which has direct contact with the sector, 19, for imparting to it movement derived from the movable point pin. The sector contact, 18, has a cam surface 18' (Fig. 4) which contacts directly with a surface, 20, on the sector, which surface is radial with respect to the axis of a pin, 21, forming the fulcrum upon which the sector is adapted to oscillate, the sector being provided, as usual, with a series of teeth, 22, which engage the teeth of a gear wheel, 23, non-rotatively secured to the arbor, 24, which carries the hand or pointer, 13.

25 is a spiral tension spring which is anchored at one end to the base disk, 1, and at the other end engages a hook, 26, on the heel end of the sector, 19, whereby the parts are normally, i. e., when the instrument is not in use, held in the positions in which they are shown in Fig. 2.

27 is a hair spring which is connected at one end to the arbor, 24, and at the other to a bridge plate, 28, or other suitable fixed part by which the back lash which would otherwise be incident to the movement of the parts by the spring 25, is taken up.

It will be understood that when the points of all of the point pins, 8 and 9, lie in the same straight line as shown by the line X in Fig. 1, the pointer, 13, will stand at zero on the dial, 29, so that if a plane surface be pressed against the movable point pin, 9, and into contact with the fixed point pins, 8, the fact that the surface is plane will be indicated by the further fact that the pointer stands at zero. When in these positions, the contact surface, 20, of the sector 19 will be in its zero position, i. e., perpendicular to the axis of the movable point pin 9, or in other words, perpendicular to its direction of movement and also the direction of movement of all parts which it carries (see $9^x$, Figs. 3 and 4), said contact surface being, however, at all times radial with respect to the fulcrum axis, $21^x$, of the sector.

It is manifest that the extent of the angular movement of the sector from its zero position, in either direction, will gradually increase or decrease in proportion to the straight line movement of the point pin, 9, accordingly as the contact surface of the sector approaches, or recedes, from its zero position, i. e., perpendicular to the line of movement of the point pin, 9. It therefore follows that if a lens having a convex surface (Y, Fig. 1) is pressed against the point pin 9 it will move the latter inward past the plane X and cause the contact surface 20 to assume an angular position relatively to said perpendicular $9^x$ and as this angle increases the movement of the toothed portion 22 of the sector would proportionately decrease if the point of contact between the sector contact 18 and the surface 20 remained constantly in the same right line ($9^x$ Fig. 4), but by reason of the cam shape 18' of the sector contact it will be observed that as the angular movement of the sector increases the point of contact between the cam and the surface 20 gradually moves toward the fulcrum axis, 21ˣ, of the sector (Fig. 4). Precisely the reverse of these operations will take place if the concave surface of a lens be pressed against the point pins, as indicated at Z, Fig. 1. In the one instance the leverage of the arm of the sector on which the contact surface 20 is formed is decreased, moving from the point $x$ to the point $y$, and in the other it is increased, moving from the point $x$ to the point $z$. This variation of the leverage of the arm of the sector is desirable in order to have exactly one half of the dial used for convex lenses and one half for concave lenses, it being understood that concave lenses have more curvature than convex lenses of the same focal length.

As shown on the dial (Fig. 1) this instrument is capable of measuring curvatures from minus (−) 10 to plus (+) 10 or from $y$ to $z$, making one complete revolution of the pointer, but by adjusting the sector contact laterally on arm 17, I am able to either increase or decrease the movement of the pointer. Also by adjusting the movable point pin endwise relatively to the nut 16, I am able to change the zero relations. These adjustments provide ample means by which the instrument may be set to measure lenses of different materials which vary slightly in their curvatures;—and at the same time afford means for subsequent adjustment during the use of the instrument.

What I claim as new and desire to secure by Letters Patent is:

1. A lens measure having, in combination, a movable point pin, means for confining it to a right line movement, a sector contact carried by and movable with said point pin and adjustable relatively thereto, laterally with respect to said line of movement, a pointer and means for transmitting movement from the sector contact to the pointer.

2. A lens measure having, in combination, a movable point pin, means for confining it to a right line movement, a nut carried by the point pin and adjustable relatively thereto in the direction of its line of movement, a sector having a contact surface which is transverse to said line of movement when the parts are in zero positions, a sector contact carried by the nut aforesaid and adjustable relatively thereto in lines transverse to its line of movement, a pointer, and means for transmitting movement from the sector to the pointer.

3. A lens measure having, in combination, a movable point pin, a nut carried thereby and adjustable thereon relatively thereto, in the direction of its axis, means for confining the point pin to a right line movement, a sector contact carried by the nut and adjustable relatively thereto on a line transverse to the line of movement of the point pin, a sector having a contact surface engaged by said sector contact, said contact surface being radial with respect to the fulcrum axis of the sector.

4. A lens measure having, in combination, a movable point pin having a screw thread, means for confining said pin to a right line movement, a threaded nut engaging the threads of the point pin whereby it is adjustable thereon in the direction of said right line movement, a threaded pin carried by and projecting from said nut in a direction transverse to said line of movement, a sector contact carried by said pin and adjustable thereon in the direction of its length, a sector having a contact surface which is radial with respect to its fulcrum axis, a pointer, and means for transmitting movement from the sector to the pointer.

5. A lens measure having a casing comprising a rigid circular disk, a cylindrical marginal flange integral with said disk, said flange being cut away upon a line which chords it, thereby forming an opening through the flange and providing the flange, adjacent to said opening, with flat surfaces occupying the plane of the chord aforesaid, and a point block having flat surfaces engaging the flat surfaces aforesaid, the cut away portion of the flange being of less width than the depth of the flange, whereby portions of the flange lying in planes outside of the opposite facings of the point block and spanning the opening are left intact, the point block and flange being rigidly secured together.

6. A lens measure having, in combination, a movable point pin, a sector, a fulcrum therefor, said sector having contact surface which is radial to its fulcrum, a sector contact convexly curved toward and engaging said contact surface, means for transmitting movement from the point pin to the sector contact and confining the latter to a right line movement in a line that is tangential to an arc struck from the fulcrum axis of the sector.

AUSTIN T. WEBB.

Witnesses:
L. M. HOPKINS,
CHARLES W. PETERSON.